UNITED STATES PATENT OFFICE.

SPENCER B. NEWBERRY, OF BAYBRIDGE, OHIO, ASSIGNOR TO SANDUSKY PORTLAND CEMENT COMPANY, OF CLEVELAND, OHIO.

BASIC LINING FOR KILNS.

1,156,018.   Specification of Letters Patent.   Patented Oct. 5, 1915.

No Drawing.   Application filed April 13, 1914.   Serial No. 831,615.

*To all whom it may concern:*

Be it known that I, SPENCER B. NEWBERRY, a citizen of the United States, residing at Baybridge, in the county of Erie and State of Ohio, have invented a new and useful Improvement in Basic Linings for Kilns, of which the following is a specification, the principle of the invention being herein explained and the best mode in which I have contemplated applying that principle, so as to distinguish it from other inventions.

This particular composition of matter, which I have invented and believe to be patentable is "basic refractory lining for kilns."

My inventive composition consists preferably, of the following ingredients combined in substantially the proportions stated, viz:

Cement clinkers: 100 parts by weight.
Calcium chlorid: 10 to 20 parts by weight.

The cement clinkers and calcium chlorid are thoroughly mixed by agitation or otherwise with or without the addition of water, and finally the mass is formed into suitable blocks in any approved manner.

It is well known that the use of ordinary fire brick, composed chiefly of silica and alumina, as a lining for kilns in which basic or alkaline substances such as lime or cement, are calcined, presents serious difficulties, owing to the formation of fusible compounds of the constituents of the fire brick with the lime or other bases of the charge, by which the brick are rapidly fluxed away and destroyed. For this reason, attempts have been made to replace fire brick by lining material as a basic character, such as Portland cement clinker. Clinker brick are ordinarily made by mixing Portland cement clinker, cement and water, molding the mixture into the form of blocks, allowing them to set and harden in the usual way, and after drying, employing the blocks in the same manner as fire brick in the lining of the kilns. Lining of this character has, however, the serious drawback that when exposed to heat in the operation of the kiln, while the inner surface, subjected to high heat, becomes sintered and hard, and the rear of the blocks, which are only slightly heated, retain their hardness, there is a zone below the inner surface which is heated only to low redness, in which the cohesion of the mass is almost completely destroyed. Such linings tend, therefore, to spall or scale off in use, and though sometimes fairly successful, they have generally been abandoned after extended trial. To overcome this drawback I devised the plan of subjecting the molded clinker brick to calcination at uniformly high temperature in special furnaces before placing them in the kilns in which they are to be used, and was granted United States Patent No. 927585 on this invention.

I have long hoped, however, to find some ingredient or method of treatment which would overcome the tendency of clinker concrete to soften and disintegrate when heated to redness, and would thus make previous calcination of the blocks unnecessary. As the result of experiments extending over several years I have found such an ingredient in the halids of the alkaline earth metals, for example calcium chlorid. These substances, in themselves easily fusible, such as the chlorid, bromid or fluorid of calcium, magnesium, barium or strontium, when heated to redness with materials high in lime, such as cement clinker, have the property of forming difficultly fusible, insoluble and non-hygroscopic compounds with the lime-bearing substances, and cementing the latter together into a mass which is firm and solid either in the cold or at a red or nearly white heat. Taking calcium chlorid, for example, as the commonest and cheapest material of this class: Alone it absorbs water rapidly from the air, is readily soluble in water, and fuses at a red heat to a clear liquid. Mixed with lime or a substance rich in lime, such as cement clinker, however, and heated to redness, it forms a solid infusible mass which on cooling does not absorb moisture from the air and is not softened by water. If blocks are formed of cement clinker mixed with a strong solution of calcium chlorid, dried, and heated in such a manner that one face shall be nearly white hot, the middle red hot, and the back but slightly heated, such blocks on cooling are found to be solid and firm throughout and show no zones of weakness or lack of cohesion, such as are evident in blocks made without the chlorid and similarly treated.

In practical use I mix Portland cement clinker, slightly pulverized to a mixture of fine and coarse material passing a ten-mesh or twenty-mesh sieve, with about fifteen per cent. of its weight of calcium chlorid dissolved in eight to ten per cent. of water, and form blocks of the mixture by tamping into molds. The blocks set and harden quickly; when hardened they are dried by heat and built into the kilns in the usual way, forming a lining, eight inches to twelve inches thick. Such lining may be used for long periods without failure.

The above described process may be varied in several ways. If desired, the blocks, before placing in the kilns, may be given a previous calcination at uniform temperature, to render them homogeneous and increase their hardness. To overcome a tendency of certain kinds of clinker to fall to dust on cooling after long-continued heating, lime or dolomite lime may be added, to the amount of ten to twenty per cent. to the clinker mixture. Finally, calcium bromid or fluorid, or the chlorid, bromid or fluorid of magnesium, strontium, or barium may be used in place of calcium chlorid. The fluorids, however, are insoluble in water, and owing to their great fluxing action must be used in small proportion, preferably not exceeding five per cent. of the weight of clinker. Other fusible substances which have the property of combining with alkaline earth bases to form infusible compounds may be employed in place of the above reagents, without departing from the essential nature of this invention. It is understood also that the clinker used may be granulated and free from fine powder, or pulverized to any desired degree. The mixture may also be tamped or grouted into the kiln, without the molding of separate blocks.

My invention being thus described with sufficient thoroughness, what I desire to secure by Letters Patent and therefore claim specifically, is:

1. A basic refractory lining for kilns, comprising Portland cement clinker, with the addition of ten to twenty per cent. of calcium chlorid.

2. The process of making basic refractory lining for kilns, which consists in mixing coarsely pulverized cement clinker with ten to twenty per cent. of calcium chlorid and water, forming blocks of the mixture, and drying the blocks.

3. The process of making basic refractory lining for kilns, which consists in mixing cement clinker with ten to twenty per cent. of lime and ten to twenty per cent. of calcium chlorid, forming the mixture into blocks, and drying the blocks.

4. A basic lining for kilns, comprising Portland cement and ten to twenty per cent. of a fusible substance capable of forming when heated therewith a difficultly fusible compound.

5. A basic refractory lining for kilns, comprising cement and ten to twenty per cent. of the halid of an alkaline earth metal.

6. The process of making basic refractory lining for kilns, which consists in mixing coarsely pulverized cement clinker with about fifteen per cent. of the halid of an alkaline earth metal dissolved in about ten per cent. of water.

7. The process of making basic refractory lining for kilns, which consists in mixing cement clinker with ten to twenty per cent. lime and a fusible substance capable of forming when heated therewith a difficultly fusible compound.

8. A basic lining for kilns comprising cement clinker, mixed with ten to twenty per cent. by weight of lime and ten to twenty per cent. by weight of the halid of an alkaline earth metal.

9. A basic lining for kilns comprising cement mixed with from ten to twenty per cent. of a fusible substance such that the cohesion of the compound is maintained under both white and red heat.

Signed by me, this 11th day of April, 1914.

SPENCER B. NEWBERRY.

Attested by—
 CHARLOTTE G. MUELLER,
 A. L. SCHLEGEL.